Oct. 30, 1962 R. H. AYMAR ET AL 3,060,581
DENTAL HANDPIECE WITH REMOVABLE TURBINE-AND-BEARING
ASSEMBLY AND LIQUID COOLED BURR
Filed July 1, 1960 3 Sheets-Sheet 1
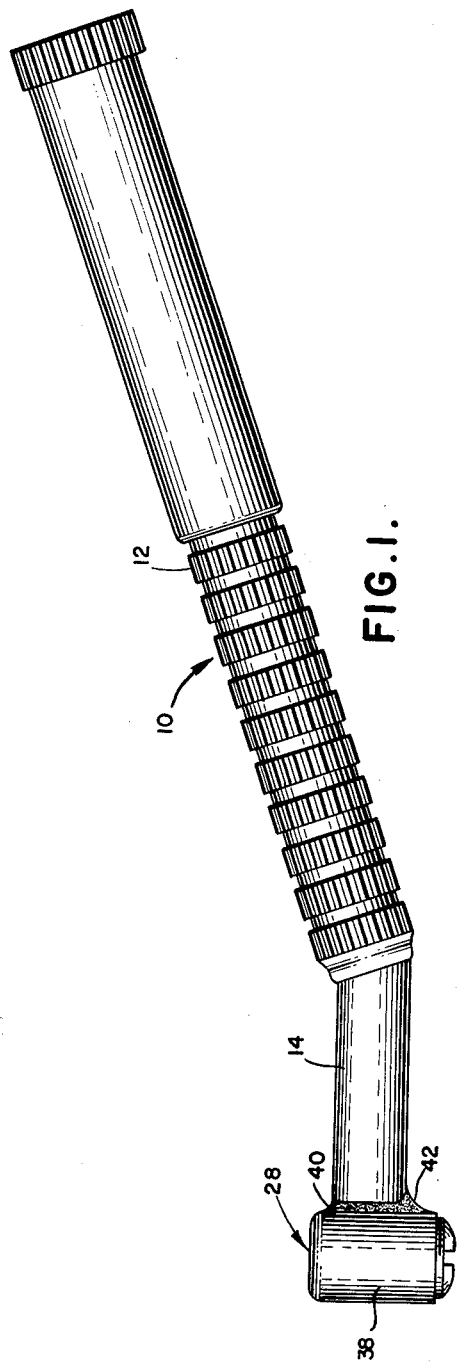
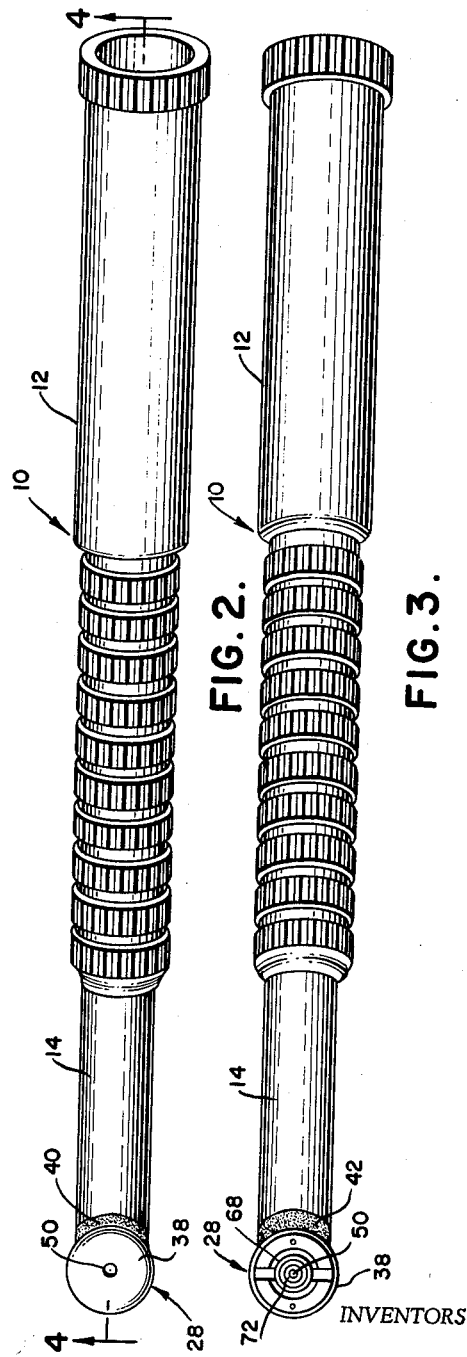
INVENTORS
Robert H. Aymar &
Earl R. Weiner
BY Karl W. Flocks
ATTORNEY

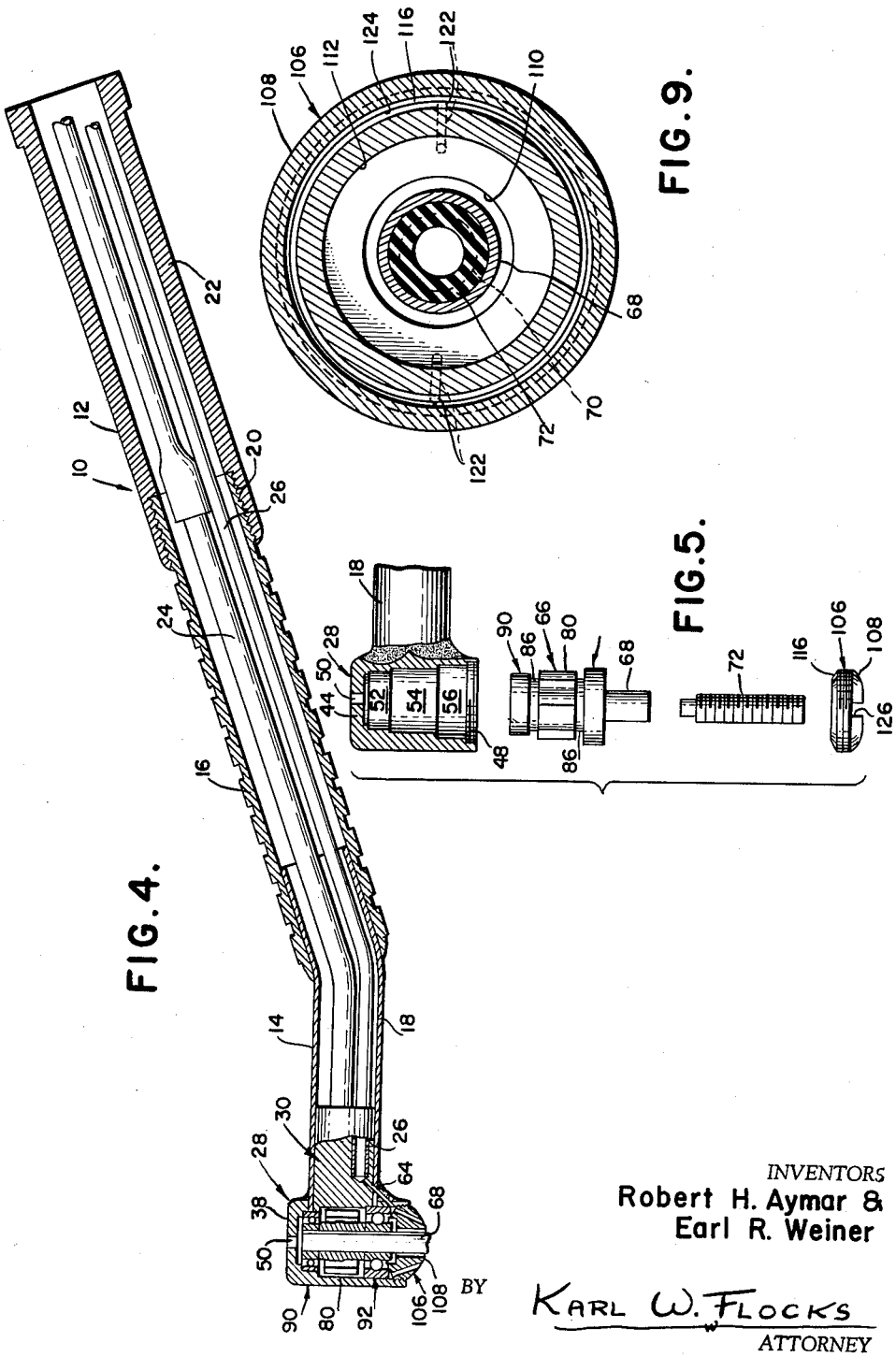

Oct. 30, 1962 R. H. AYMAR ET AL 3,060,581
DENTAL HANDPIECE WITH REMOVABLE TURBINE-AND-BEARING
ASSEMBLY AND LIQUID COOLED BURR
Filed July 1, 1960 3 Sheets-Sheet 3

INVENTORS
Robert H. Aymar &
Earl R. Weiner

BY *Karl W. Flocks*
ATTORNEY

United States Patent Office 3,060,581
Patented Oct. 30, 1962

3,060,581
DENTAL HANDPIECE WITH REMOVABLE TURBINE-AND-BEARING ASSEMBLY AND LIQUID COOLED BURR
Robert H. Aymar, Prince Georges County, and Earl R. Weiner, Baltimore, Md., assignors to We-Mar, Inc., Hyattsville, Md., a corporation of Maryland
Filed July 1, 1960, Ser. No. 40,291
3 Claims. (Cl. 32—27)

This invention relates generally to dental handpieces and is more particularly directed to a dental handpiece having a fluid pressure driven turbine and liquid cooled bearing and burr.

Dental handpieces incorporating a pneumatically driven turbine for rotating the burr are a relatively new innovation. The turbine will rotate at a relatively high speed, approximately 200,000 r.p.m., and is of very light weight and develops little torque. Turbines of the character utilized in dental handpieces of this kind are very small, being approximately ¼ inch in diameter. Of critical concern in this type of apparatus is the life-span of the bearings used to support the turbine, the coolness of the instrument which is being used in a patient's mouth, and the effectiveness with which the bearings and drilling or grinding burr is cooled.

Further, inasmuch as the bearings of the instrument must upon occasion be replaced, it is of critical importance that maintenance of this character be readily and expeditiously performed in the dentist's office, even when the patient is in the dentist's chair.

A primary object of this invention is to provide a dental handpiece incorporating a relatively simple and inexpensive construction, giving rise to ready maintenance and repair with a minimum of skill and effort.

A further object of the invention is to provide a dental handpiece including means whereby the dental burr may be readily and expeditiously cooled, the construction of such means being simple in character and efficient for the purpose intended.

Another object of the invention is to provide a dental handpiece incorporating an integral turbine-and-bearing assembly retained in the housing of the handpiece by means of a retaining collar which forms a liquid cooling chamber serving to maintain a portion of the bearing means cool and having passage portions directing cooling liquid onto the burr operated by the turbine-and-bearing assembly.

And yet another object of the invention is to provide a novel retaining collar for a fluid pressure operated dental handpiece, such collar including means retaining the turbine-and-bearing assembly in position in a housing and means for directing a cooling liquid for the drilling burr regardless which side of a tooth is being drilled.

Other objects of the nature and advantages of the instant invention will be apparent from the following description taken in conjunction with the accompanying drawings, wherein:

FIG. 1 is a side elevation of a contra-angle dental handpiece incorporating the invention therein;

FIG. 2 is a top plan view of FIG. 1;

FIG. 3 is a bottom plan view of FIG 1;

FIG. 4 is a longitudinal section taken substantially on line 4—4 of FIG. 2;

FIG. 5 is an exploded side elevation showing a fragmentary portion of the dental handpiece housing, broken away and shown in section for the purpose of clarity, showing the various components of the dental handpiece which can be separated during maintenance in a dentist's office;

FIG. 9 is a fragmentary section taken substantially on line 9—9 of FIG. 7.

Figure 8:
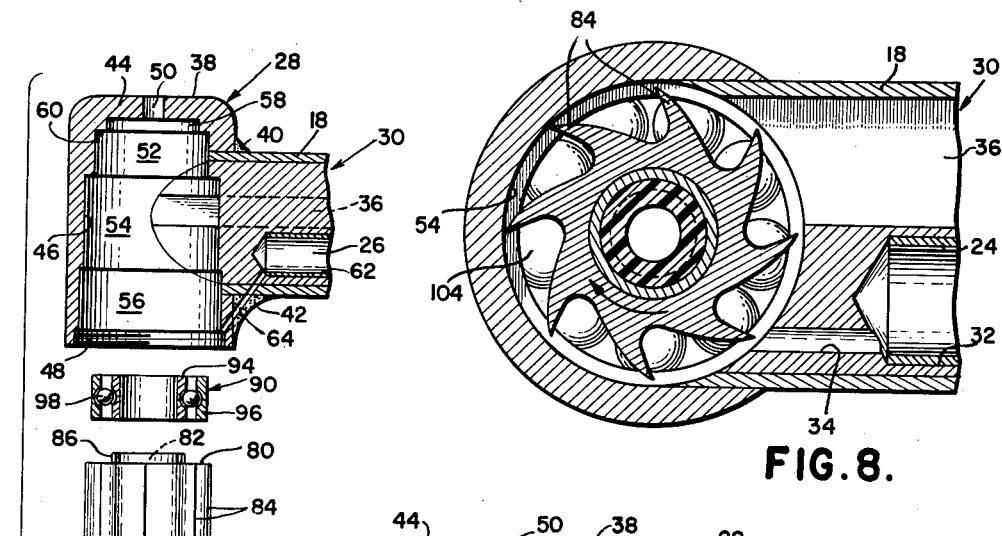
FIG. 8 is a section taken substantially on line 8—8 of FIG. 7 illustrating the relationship of the turbine blades to the lower bearing elements of the dental handpiece.

Referring to the drawings in detail, the contra-angle dental handpiece is indicated generally at 10 and comprises a tubular handle 12 integral with an angularly tubular neck 14. The handle 12 and neck 14, see FIG. 4, has a two-piece construction including a knurled sleeve 16 telescopically receiving and being secured to an angular sleeve 18, the knurled sleeve 16 being externally threaded at 20 and receiving thereon an upper sleeve portion 22. Extending longitudinally of the sleeves 16, 18 and 22 are fluid conducting lines 24 and 26 for respectively communicating a source of pneumatic fluid pressure and cooling liquid to a transversely disposed housing 28 via a neck block 30 secured in the terminal end of the sleeve 18.

It should be kept in mind that the dental handpiece under consideratinn is shown approximately double its actual size in FIGS. 1 through 4, and accordingly the construction and assembly of the same involves "micromechanics" in which tolerance control is extremely critical.

Figures 6, 7:
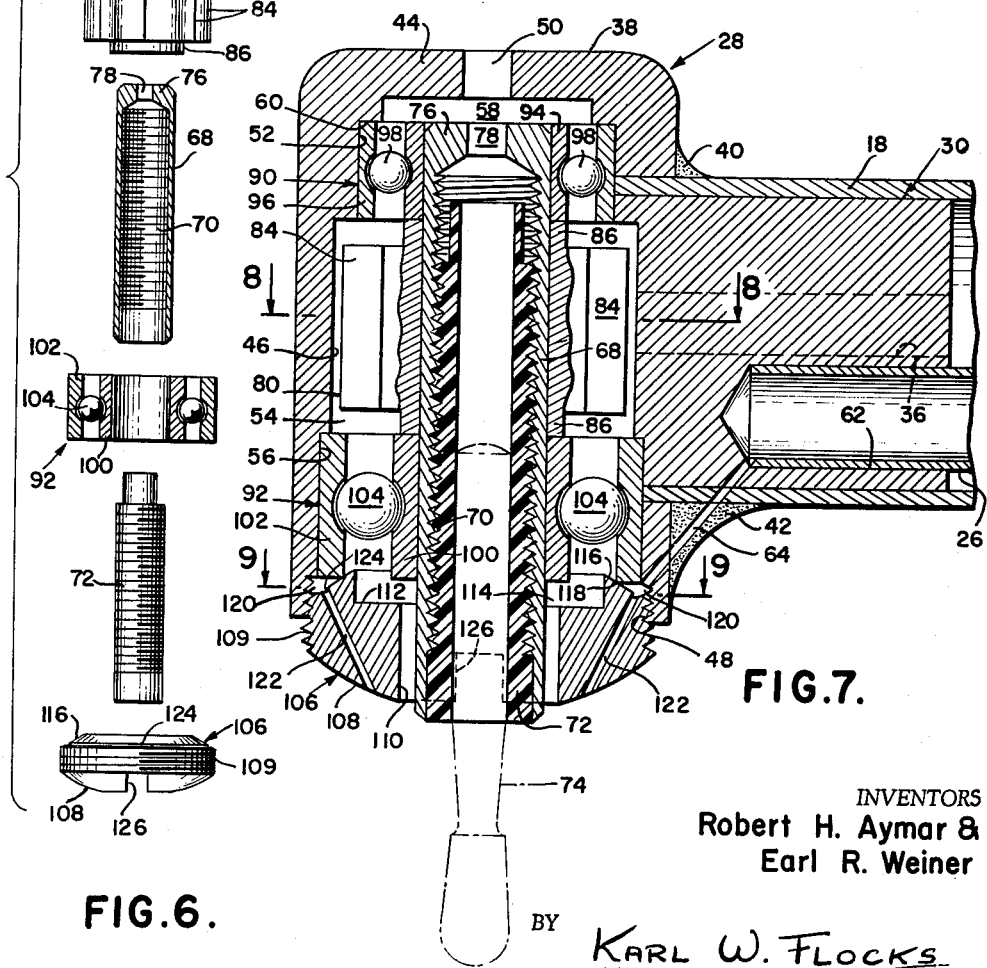
FIG. 6 is an exploded elevation, similar to FIG. 5 and on an enlarged scale, showing the turbine-and-bearing assembly in its separated condition with portions of the bearings and turbine shaft being shown in section.
FIG. 7 is a further enlarged longitudinal section, similar to a portion of FIG. 4, showing in further detail the construction of the dental handpiece and showing by means of phantom lines a dental burr in its operative position.

Neck block 30 includes in its upper portion, see FIGS. 6–8, a passage 32 receiving the end of tube 24 therein, and a longitudinally extending inlet orifice 34 communicates with the tube 24, as clearly seen in FIG. 8. Diametrically opposed to the orifice 34 is a scavenging passage 36 which communicates with the interior of the dental handpiece handle exteriorly of the tubes 24 and 26.

The housing 28 comprises a hollow body member 38 secured to the tubular sleeve 18 by means of silver soldering at 40 and 42, and includes a transverse upper end wall 44 forming a downwardly opening annular chamber 46 internally threaded at 48 at its lower end. Extending transversely to the wall 44 and axially of the chamber 46 is an aperture 50 providing means whereby particulate material may be aspirated from the housing and venting the upper end of the annular chamber 46 to the atmosphere.

The annular chamber 46 comprises a first chamber portion 52, a second chamber portion 54, and a third chamber portion 56. Communicating with the first chamber portion 52 and the aperture 50 is an undercut axial recess 58 forming an annular abutment shoulder 60. It will be noted that the diameters of the chambers 52—56 increase toward the lower open end of the housing. Extending angularly from a blind bore 62 in the neck block 30, this blind bore receiving the terminal end of the liquid tube 26 therein, see FIG. 6, is a liquid-receiving passage 64 which communicates with the third chamber portion 56 of the annular chamber 46 at the top of the threaded portion 48, see FIG. 7.

Indicated generally at 66 is a turbine-and-bearing assembly or capsule which comprises a separate integral unit available to the dentist as part of a maintenance kit of the dental handpiece. The capsule 66 includes a turbine shaft 68, see FIG. 6, having an axial bore 70 in which is frictionally received an open-ended plastic tubular insert 72. The insert 72, see FIG. 7, removably receives a dental burr 74 in its lower end and is open at its open end. The shaft 68 is closed at its upper end by a transverse wall 76 which is apertured axially, as indicated at 78.

Secured by means of a press fit on the shaft 68 is a turbine member 80 having an axial bore 82. Circumferentially spaced about the turbine member 80 are radially extending angularly pitched blades 84 which are directed rearwardly relative to the direction of rotation in the assembled dental handpiece, see FIG. 8. The turbine member 80 includes axially projecting annular collars 86 at opposite ends. It will be noted in FIG. 8 that the orifice 34 is in tangential relationship to the chamber portion 54 and thus fluid pressure directed therefrom will engage the terminal ends of the blades 84 to attain the maximum driving force on the rotor member. The inlet 34 will direct fluid pressure intermediately of the chamber portion 54 and it will be noted that the scavenging passage 36 is diametrically opposed to the orifice 34 and has a considerably greater cross-section than this orifice in order to insure a proper scavenging of the driving fluid utilized to drive the turbine. The apex or root portions of the teeth 84 are in substantial axial alignment with the bearing elements of upper and lower bearings 90 and 92, respectively.

The upper bearing 90 includes an inner race 94 and an outer race 96 between which are retained bearing elements 98. The bearing elements 98 are loosely received between the races 94 and 96 to permit the passage of air and lubricant thereabout during operation of the dental handpiece. The inner race 94 of the bearing 90 is applied to the shaft 68 by means of a press fit and the outer diameter of the same substantially conforms to the cross-section of the chamber portion 52.

As seen in FIG. 7, the outer race 96 of the bearing 90 will abut the shoulder 60 formed in the body member 38, and the abutment collar 86 at the upper end of the turbine will be of a diameter no greater than the outside diameter of the inner race 94 in order to facilitate axial movement of exhaust air about the bearing elements 98.

In the assembled dental handpiece, some exhaust air will pass axially from the root portions of the turbine member 80 between the bearing races 94 and 96, about the bearing elements 98, out of the annular recess 58, and through the aperture 50. This will cause an aspirator effect over the upper end of the aperture 70 and thus any minute particles forced into the sleeve 72 will be drawn therefrom.

The substantially larger lower bearing 92 includes an inner race 100 and an outer race 102 between which are secured bearing elements 104. The outer diameter of the outer race 102 substantially conforms to the cross-section of the chamber portion 56 and the inner race 100 is received on the shaft 68 by means of a press fit, the lower collar 86 of the rotor spacing the bearing 92 from the lower end of the blades 84, see FIG. 7.

Some air will be exhausted axially from the root portions of the blades 84 between the races 100 and 102 and over the bearing elements 104 and pass longitudinally along the outer periphery of the shaft 68 for the purpose of cooling the dental burr 74 and removing grindings away from a tooth during drilling.

Removably received in the threaded portion 48 of the housing 38 of the dental handpiece is a retaining collar, indicated generally at 106. The collar includes means whereby the turbine-and-bearing assembly is retained in its proper oriented position within the annular chamber 46 of the housing, means whereby the lower bearing race 92 is partially water-cooled by forming a liquid cooling chamber with the outer bearing race 102, and also includes means whereby the dental burr is further cooled, i.e., in addition to the air cooling previously mentioned. The liquid cooling means is so oriented to insure that a cooling liquid is directed onto the drilling burr regardless of whether the dentist is drilling on the front or rear surface of a tooth.

The collar 106 includes a disk-like annular body member 108 peripherally threaded at 109 for engagement with the threaded portion 48 of the housing. Extending axially or transversely through the body member 108 is an apertured portion 110 through which the shaft 68 of the turbine member will extend, ample clearance being provided to permit the ready passage of exhaust air axially along this shaft through this aperture. The aperture 110 communicates with an annular increased diameter recess portion 112 which provides an annular space 114 beneath the bearing 92 to insure the movement of air, as just mentioned.

The upper surface surrounding the annular recess 112 comprises a beveled or angular face 116 which, as seen in FIG. 7, projects slightly into the space between the inner and outer races of the bearing 92 and which will tangentially sealingly engage at 118 the inner periphery of the outer race 102. Due to this point of sealing engagement, the retaining collar together with the outer race 102 and housing 38 form an annular chamber 120 which communicates with the liquid passage 64, as clearly seen in FIG. 7. Extending angularly in converging relationship from diametrically opposed sides of the retaining collar 106 are cooling liquid outlet passages 122, the upper ends of which intersect the beveled face 116 outwardly of its line of engagement with the inner edge of the bearing race 102, see FIG. 7.

The beveled face 116 has formed therein an annular groove 124 which intersects the upper end of the passages 122 to somewhat enlarge the chamber 120 and facilitate the feeding of cooling liquid to each of the passages or bores 122. The lower ends of the passages 122 converge or are directed toward the longitudinal axis of the burr 74, it being noted, as shown in FIG. 9, that the passages 122 are in diametrically opposed relationship, i.e., 180 degrees apart, and accordingly when the dentist is drilling on a front surface of a tooth, if the tooth should interfere with the cooling liquid directed from one passage 122, the other passage 122 will be free and available to direct cooling liquid onto the burr. Also, when drilling on the back surface of a tooth and the same condition occurs, there will always be available a stream of cooling liquid for cooling the burr and the tooth.

Additionally, it will be noted that the annular chamber 120, which has a cooling liquid passing therethrough, also contacts the lower edge of the outer race 102 of the bearing 92 which forms a part of this chamber. Thus the cooling liquid will conduct some of the heat generated in the bearing and accordingly the lower bearing 102 will be water cooled as well as air cooled. Referring to the cooling of the bearings, the driving fluid utilized to rotate the turbine member may have a slight amount of suitable non-toxic oil entrained therein whereby, as the air passes over the bearing elements 98 and 104, they will be lubricated.

In order to facilitate insertion and removal of the retaining collar 106, the body member 108 has a diametrically extending slot 126 formed therein, this readily receiving the blade or a screw driver or the like.

Thus there has been disclosed a pneumatically driven dental handpiece which includes means facilitating the maintenance and repair, in addition to means for readily and expeditiously cooling the bearings and further including relatively simple and readily manufactured parts constituting a minimum expense for maintenance and repair.

It will be obvious to those skilled in the art that various changes may be made without departing from the spirit of the invention and, therefore, the invention is not intended to be limited to what is shown in the drawings and described in the specification but only as indicated in the appended claims.

What is claimed is:

1. In a dental handpiece, a housing having an annular chamber open at one end, a tubular handle including a passage portion communicating with said chamber for communicating pressurized driving fluid to said chamber, a turbine-and-bearing assembly disposed axially in said annular chamber and having at least one anti-friction bearing disposed adjacent the open end of said annular chamber, said anti-friction bearing having concentric inner and outer races, anti-friction elements circumferentially spaced between said inner and outer races and between which pressurized driving fluid is exhausted, said turbine-and-bearing assembly including a burr shaft projecting axially through the inner race of said bearing, and a transversely-apertured retaining collar removably retained in the open end of said annular chamber and circumposed about said shaft for retaining said turbine-and-bearing assembly in said annular chamber and for permitting pressurized driving fluid to be exhausted axially over the outer surface of said shaft, said handle including a liquid cooling passage portion terminating above said retaining collar and below the outer race of said anti-friction bearing, said retaining collar including an upper, annular, beveled face tangentially engaging the end portion of said outer bearing race, a portion of said beveled face, the end portion of said outer bearing race, and a portion of said housing forming a second annular chamber into which liquid is received from said liquid cooling passage, said collar including at least one transverse passage portion communicating with said second annular chamber and directed angularly toward the longitudinal axis of said turbine shaft whereby said anti-friction bearing is cooled by the exhausted pressurized driving fluid and by cooling liquid passing through said second annular chamber at the one end of said outer race.

2. The structure of claim 1; the open end of said housing being internally threaded, said retaining collar being peripherally threaded and received in the internally threaded portion of said housing, said passage means of said housing communicating at the threaded portion of said housing.

3. The structure of claim 1, said retaining collar including a second passage portion diametrically opposed to said one passage portion and directed angularly toward the longitudinal axis of said turbine shaft whereby a stream of cooling liquid will be directed onto a dental burr from opposite sides of the axis of rotation of said turbine shaft.

References Cited in the file of this patent
UNITED STATES PATENTS

| | | |
|---|---|---|
| 2,442,033 | Brantley et al. | May 25, 1948 |
| 2,701,914 | Deitrich | Feb. 15, 1955 |
| 2,705,838 | Blair | Apr. 12, 1955 |
| 2,917,828 | Page | Dec. 22, 1959 |

FOREIGN PATENTS

| | | |
|---|---|---|
| 1,184,686 | France | Feb. 9, 1959 |